(12) United States Patent
Niinomi et al.

(10) Patent No.: US 8,798,783 B2
(45) Date of Patent: Aug. 5, 2014

(54) SYSTEM AND A METHOD FOR REMOTE ASSISTANCE IN A FOUNDRY

(75) Inventors: Akiyoshi Niinomi, Toyokawa (JP); Yoshitake Kawamoto, Toyokawa (JP); Yasuhiro Miwa, Toyokawa (JP); Nobuaki Natsume, Toyokawa (JP); Kenji Ishiguro, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 515 days.

(21) Appl. No.: 13/201,247

(22) PCT Filed: Feb. 8, 2010

(86) PCT No.: PCT/JP2010/051771
§ 371 (c)(1),
(2), (4) Date: Nov. 2, 2011

(87) PCT Pub. No.: WO2010/100999
PCT Pub. Date: Sep. 10, 2010

(65) Prior Publication Data
US 2012/0041588 A1    Feb. 16, 2012

(30) Foreign Application Priority Data
Mar. 2, 2009   (JP) ................................. 2009-047479

(51) Int. Cl.
| | |
|---|---|
| B29C 39/00 | (2006.01) |
| B29C 45/00 | (2006.01) |
| G06F 19/00 | (2011.01) |
| G06F 3/041 | (2006.01) |
| G09G 5/02 | (2006.01) |

(52) U.S. Cl.
USPC ........... 700/197; 345/173; 345/594; 700/202; 700/203; 700/204

(58) Field of Classification Search
CPC combination set(s) only.
See application file for complete search history.

(56) References Cited

U.S. PATENT DOCUMENTS

| | | | | |
|---|---|---|---|---|
| 3,936,713 A | * | 2/1976 | Hunkar | 318/573 |
| 4,135,569 A | * | 1/1979 | Drobnik et al. | 164/158 |

(Continued)

FOREIGN PATENT DOCUMENTS

| | | |
|---|---|---|
| JP | 63-239506 | 10/1988 |
| JP | 11-85228 | 3/1999 |

(Continued)

OTHER PUBLICATIONS

Korean Office Action, issued in corresponding Application No. PCT 2011-7016138, dated Aug. 31, 2012, 4 pages.

(Continued)

*Primary Examiner* — Kavita Padmanabhan
*Assistant Examiner* — Thomas Stevens
(74) *Attorney, Agent, or Firm* — Finnegan, Henderson, Farabow, Garrett & Dunner, L.L.P.

(57) ABSTRACT

The object of the present invention is to provide a remote assistant system for a foundry, i.e., a plant that comprises a plurality of machines. The remote assistant system in a foundry includes a first sequencer for controlling a molding line and a second sequencer for controlling a molding machine. It further includes a sequencer-communicating mechanism for connecting the first sequencer to the second sequencer, a first mobile computer for transmitting information by video images, etc. to a remote location, a mechanism for providing communication between mobile computers to selectively connect one of the sequencers to the first mobile computer, a second mobile computer for receiving the information from the first mobile computer, for displaying the information, and for correcting the ladder logic program and giving instructions to the operator by an assistant at a remote location.

5 Claims, 4 Drawing Sheets

(56) References Cited

U.S. PATENT DOCUMENTS

| | | | |
|---|---|---|---|
| 4,409,718 A * | 10/1983 | Pryor | 29/407.04 |
| 5,062,052 A * | 10/1991 | Sparer et al. | 700/197 |
| 5,237,652 A * | 8/1993 | McManus | 715/839 |
| 5,513,115 A * | 4/1996 | Richards et al. | 700/200 |
| 5,894,005 A * | 4/1999 | Steel et al. | 264/40.1 |
| 5,923,363 A * | 7/1999 | Elberbaum | 348/156 |
| 6,095,785 A * | 8/2000 | Kudert et al. | 425/130 |
| 6,154,684 A * | 11/2000 | Schwenke et al. | 700/159 |
| 6,167,319 A * | 12/2000 | Harris et al. | 700/86 |
| 6,181,985 B1 * | 1/2001 | O'Donnell et al. | 700/295 |
| 6,356,426 B1 * | 3/2002 | Dougherty | 361/102 |
| 6,505,341 B1 * | 1/2003 | Harris et al. | 717/100 |
| 6,603,842 B2 * | 8/2003 | Elberbaum | 379/106.01 |
| 6,675,866 B2 * | 1/2004 | Amano et al. | 164/154.1 |
| 6,828,695 B1 * | 12/2004 | Hansen | 307/31 |
| 7,069,106 B2 * | 6/2006 | Tanizawa et al. | 700/180 |
| 7,379,779 B2 * | 5/2008 | Ekberg | 700/95 |
| 7,461,012 B2 * | 12/2008 | Elberbaum | 705/27.1 |
| 7,639,907 B2 * | 12/2009 | Elberbaum | 385/24 |
| 8,501,060 B2 * | 8/2013 | Johnson | 264/40.6 |
| 2002/0024332 A1 * | 2/2002 | Gardner | 324/103 R |
| 2002/0042738 A1 * | 4/2002 | Srinivasan et al. | 705/14 |
| 2002/0055422 A1 * | 5/2002 | Airmet et al. | 482/61 |
| 2002/0133264 A1 * | 9/2002 | Maiteh et al. | 700/182 |
| 2004/0098391 A1 * | 5/2004 | Robertson et al. | 707/10 |
| 2004/0248066 A1 * | 12/2004 | Recigno | 433/213 |
| 2005/0171661 A1 | 8/2005 | Abdel-Malek et al. | |
| 2005/0222701 A1 * | 10/2005 | Ekberg | 700/107 |
| 2005/0246152 A1 * | 11/2005 | Kokatsu et al. | 703/22 |
| 2006/0154642 A1 * | 7/2006 | Scannell, Jr. | 455/404.1 |
| 2006/0212134 A1 * | 9/2006 | Dhawan | 700/3 |
| 2007/0142177 A1 * | 6/2007 | Simms et al. | 482/8 |
| 2009/0121842 A1 * | 5/2009 | Elberbaum | 340/10.5 |
| 2011/0106288 A1 * | 5/2011 | Catoen et al. | 700/108 |
| 2012/0223675 A1 * | 9/2012 | Bianco | 320/109 |
| 2012/0274219 A1 * | 11/2012 | Woytowitz et al. | 315/152 |

FOREIGN PATENT DOCUMENTS

| | | |
|---|---|---|
| JP | 2002-41132 | 2/2002 |
| JP | 2002-123306 A | 4/2002 |
| JP | 2002-247221 | 8/2002 |
| JP | 2002-258935 | 9/2002 |
| JP | 2003-271204 | 9/2003 |
| JP | 2004-21575 | 1/2004 |
| JP | 2004-334631 | 11/2004 |
| JP | 2005-059075 | 3/2005 |
| JP | 2008-171388 | 7/2008 |
| KR | 100836886 B1 | 6/2008 |

OTHER PUBLICATIONS

European Patent Office, Supplementary European Search Report issued in corresponding Application No. EP 10 74 8596, dated Jun. 21, 2012, 1 page.

International Search Report dated Mar. 9, 2010 issued in International Application No. PCT/JP2010/051771.

* cited by examiner

SYSTEM AND A METHOD FOR REMOTE ASSISTANCE IN A FOUNDRY

TECHNICAL FIELD

The present invention relates to a system and a method for remote assistance in a foundry. More specifically, it relates to a system and a method for remotely assisting urgently handling a problem in a molding machine or a molding line that is used to produce casts.

BACKGROUND ART

An interactive and remote maintenance system has been well known. It is used for searching for the cause of an electrical problem in a machine and repairing it. It utilizes a communication line such as a telephone line (e.g., Japanese Patent Laid-open Publication No. 2002-41132).

The system disclosed in that publication uses a video camera that is placed near the machine. Thus it is not appropriate for a remote assistant system for a large plant such as a molding line that includes a molding machine or a casting line that includes a pouring machine in a foundry, because a fixed video camera cannot detect all locations of trouble in a large plant. Further, since the layouts of foundries differ depending on the goods that are cast, production lots, or foundry processes, the position of the video camera cannot be definitely determined. In addition, it is difficult for operators to remember the names of many parts of the machines. It is also difficult to understand the relationships between these parts. It is not easy to judge if the trouble is caused by the molding machine or by the molding line.

An assistant, who is at a remote location away from the foundry, has a similar problem in assisting the operator. Since the layouts of foundries differ depending on the plants, it is difficult to forecast the location of trouble in a molding machine or a molding line. Thus it is difficult for an assistant who is at the remote location to quickly instruct the operator on what he or she should do. Even if the location of the trouble is found, the conventional fixed video camera is generally located far from the location. Thus it is difficult to quickly realize the cause of the trouble and give instructions to repair the cause. Further, if information on a ladder logic program is merely used for making repairs, an unexpected circumstance may occur, because the machine or line may be reactivated without the safety being checked. For example, there may be an obstacle in the way of a part in the plant that is being moved. Or, there may be a person near the plant. Thus there has been a need for a system for remote assistance that is safer.

Further, the interactive and remote maintenance system disclosed in the publication is supposed to have only one PLC (Programmable Logic Controller; see FIG. 1, etc., of the publication). Thus, when a plurality of PLCs is installed in each molding machine or molding line, information by video images that are taken by a fixed video camera cannot be used. Therefore it is difficult for the assistant at the remote location to give instructions regarding the PLC and the location of the trouble to the operator, who is far from the assistant. Especially, in an urgent case, since the operator is not accustomed to such operations, the assistance is more important.

DISCLOSURE OF INVENTION

The present invention has been conceived by considering those needs and situations. Therefore the object of the present invention is to provide a remote assistant system that can be safely used in a foundry that comprises at least a molding line or a molding machine. Specifically, it is to provide a remote assistant system for urgently handling a problem in a molding machine, etc., in a foundry. In addition, the object of the present invention is to provide a method for remote assistance in a foundry that uses the system.

To achieve the object, the system for remote assistance is configured to be applied to a foundry that has a plurality of machines and lines. The machines and lines are controlled by the respective PLCs. Specifically, the foundry has molding machines and molding lines. As shown in FIGS. 1 and 2, for example, the remote assistant system in the foundry comprises a touchscreen panel 3 for operating a molding line 2 that comprises at least a molding machine 1, a first sequencer 4 for controlling the molding line 2, a touchscreen panel 5 for operating the molding machine 1, and a second sequencer 6 for controlling the molding machine 1. The system also comprises a sequencer-communicating means 7 for connecting the first sequencer 4 to the second sequencer 6; a first mobile computer 8 that is connected to the sequencer-communicating means 7, and a wireless communicating means 9 for connecting either the sequencer 4 or 6 to the first mobile computer 8. The first mobile computer 8 obtains information by video images on the appearance of a molding machine 1 or molding line 2 that has trouble, information by voice, and information on the ladder logic program of the first sequencer 4 or second sequencer 6 that is installed in the molding machine 1 with trouble or molding line 2 with trouble, respectively. The first mobile computer 8 transmits the information by video images and voice and the information on the ladder logic program of the first sequencer 4 or second sequencer 6. The system also comprises a second mobile computer 13 that displays the information by video images and by voice and the information on the ladder logic program of the first sequencer 4 or second sequencer 6 and a means 14 for providing communication between the first mobile computer 8 and the second mobile computer 13. The second mobile computer 13 transmits data for correcting the ladder logic program and instructions on how to repair the molding machine 1 or the molding line 2. Thus the remote assistant system can be used for repairing machines in a foundry with trouble.

As shown in FIG. 3, for example, the method for remote assistance comprises the steps of searching for a first possible location that has trouble by moving the position for obtaining information by video images, information by voice, and information on the ladder logic program regarding a molding line and a molding machine that may have a problem (S10); identifying a second possible location in the molding machine or the molding line that has trouble, by using the ladder logic program (S20); checking to see if the first possible location is the same as the second possible location (S30); and assisting by giving instructions to repair the molding machine or molding line based on the result of the step of checking (S40).

By the system and method for remote assistance of the present invention, urgent instructions can be given for repairing a molding machine with trouble, etc., in a foundry that comprises a molding line having a plurality of machines that is controlled by means of PLCs.

Further, since information by video images and that by voice are checked as well as information on the ladder logic program, risks to restart a large plant without checking its circumstances (for example, for an obstacle possibly in the way of a part that is being moved, or a person possibly standing adjacent to the plant) can be significantly reduced. Thus the safety for operators is ensured.

The system for remote assistance of the present invention has its safety enhanced for repair work by using an additional motion sensor. Here the "motion sensor" is a sensor for detecting a person being at a predefined area. The motion sensor uses infrared rays, ultrasonic waves, visible light, etc. It may use a combination of infrared rays and ultrasonic waves.

The second sequencer of the system of the present invention may comprise, for each expendable part of the molding machine, a means for memorizing a criterion of how many times the part can be used, a means for counting the number of times the part is actually used, and a means for comparing the number counted with the number used as a criterion.

The present invention has an advantageous effect, i.e., enabling the preventive maintenance of the parts of a molding machine, etc., of a foundry that comprises a molding line having a plurality of machines.

Further, the system for remote assistance of the present invention may comprise a personal computer for analyzing waveforms. The personal computer is connected to the molding machine. It stores and analyzes the data on waveforms generated by molding in the molding machine to investigate a location with trouble in the molding machine. Thus an advantage is achieved in that the preventive maintenance and the quality control of molding are simultaneously performed in the molding machine.

The basic Japanese patent application, No. 2009-047479, filed Mar. 2, 2009, is hereby incorporated by reference in its entirety in the present application.

The present invention will become more fully understood from the detailed description given below. However, the detailed description and the specific embodiment are only illustrations of desired embodiments of the present invention, and so are given only for an explanation. Various possible changes and modifications will be apparent to those of ordinary skill in the art on the basis of the detailed description.

The applicant has no intention to dedicate to the public any disclosed embodiment. Among the disclosed changes and modifications, those which may not literally fall within the scope of the present claims constitute, therefore, a part of the present invention in the sense of the doctrine of equivalents.

The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein, is intended merely to better illuminate the invention, and so does not limit the scope of the invention, unless otherwise claimed.

BEST MODE FOR CARRYING OUT THE INVENTION

Figure 1:
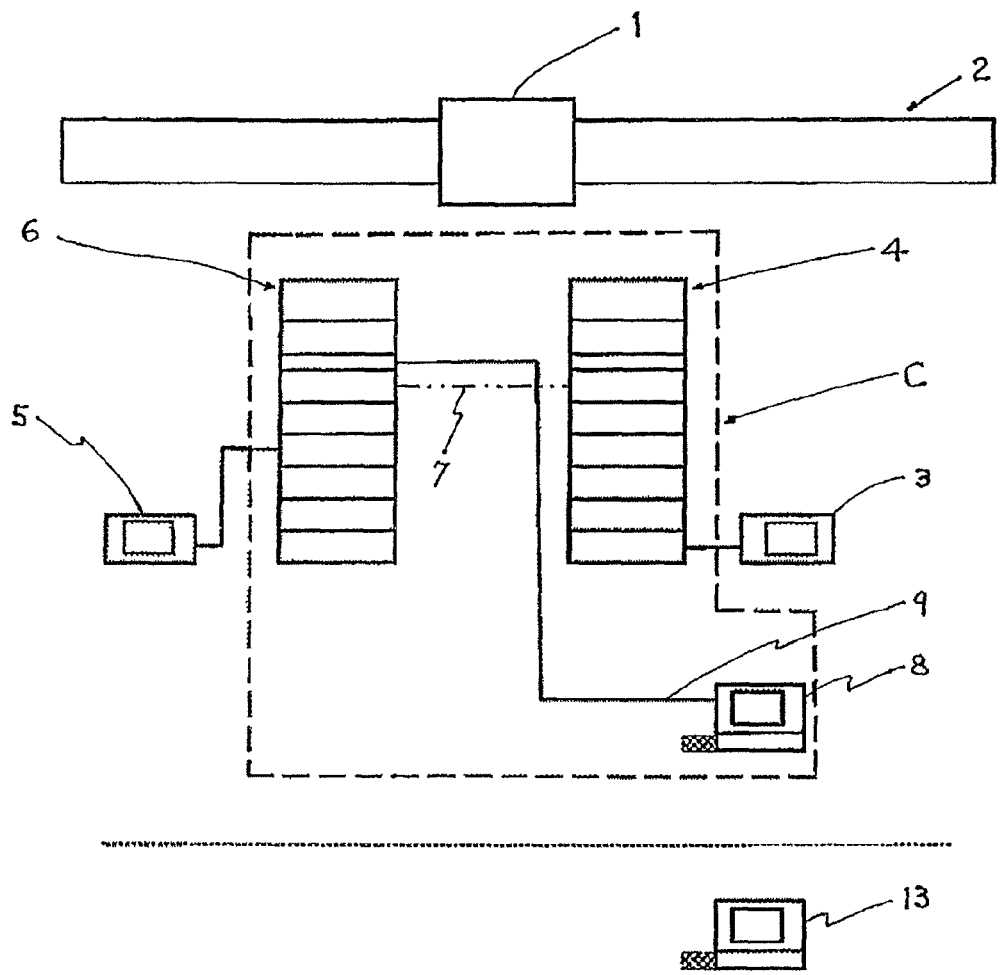
FIG. 1 is a schematic drawing of the system for remote assistance of the present invention.

Below, the embodiments of the present invention are described. The remote assistant system in a foundry as an embodiment comprises at least a touchscreen panel for operating a molding line that comprises a molding machine, a first sequencer for controlling the molding line, a touchscreen panel for operating the molding machine, and a second sequencer for controlling the molding machine. It also comprises a sequencer-communicating means for connecting the first sequencer to the second sequencer, a first mobile computer that is connected to the sequencer-communicating means, a wireless communicating means for selectively connecting the mobile computer to one of the sequencers, a second mobile computer that is used by an assistant to correct online a ladder logic program and to give instructions to the operator, and a wireless computer-communicating means for connecting the first mobile computer to the second mobile computer. The first mobile computer transmits information regarding a molding machine or a molding line that has trouble to a remote location. The information is taken by an operator. The operator carries a handy camera and a headphone to take the information by video images and voice. He or she also takes the information on the ladder logic programs of the first and second sequencer that are installed in the molding machine and the molding line, respectively. The second mobile computer displays the information by video images or by voice or the information on the ladder logic program of the first or second sequencer.

The molding machine is any type of machine for forming molds into which molten metal is poured.

The molding line is a line for producing casts, which line includes the molding machine. The molding line is installed together with a line for pouring molten metal, a line for taking out casts, a line for cooling casts, and a line for treating sand. The molding line is usually several tens of meters long. Thus no fixed camera, even one having a telescopic lens, can take a good video image from a distant location. If multiple cameras are placed, the system becomes more complicated. Further, the locations of troubles are not constant, as troubles may occur at various locations. Thus more cameras must be placed than are necessary. In the present invention a portable camera is used to take video images by a proper angle and at a proper magnification.

The touchscreen panel is a panel for operating a molding line or a molding machine. The operator's command is input by a touch. Typically the molding line or the molding machine is operated only by the touchscreen panel. The touchscreen panel is also used to make repairs.

The first sequencer is a controller that controls sequences for the molding machine. The second sequencer is a controller that controls sequences for the molding line.

The sequencer-communicating means is a communicating means for connecting the first sequencer to the second sequencer.

The first mobile computer is a mobile computer that stores a program having a function to obtain the information by video images and by voice and the information on the ladder logic program regarding the molding machine or the molding line.

The means for providing communication between mobile computers is a means for providing communication between the first mobile computer and the second mobile computer. Typically it is a wireless communicating means, since the molding line is not configured to be flat. Normally a line for treating sand and a molding line are configured in two layers. In this configuration, if the means for providing communication is not wireless, the communicating lines become complicated.

The second mobile computer is a mobile computer that stores a program having a function to obtain, display, and store the information by video images and by voice and the information on the ladder logic program regarding the molding machine or the molding line. Since the second mobile computer is mobile, it is possible to immediately give instructions on countermeasures suited to the situation. For example, it is possible to give instructions while traveling. It is possible to give instructions while an assistant is on the way to the foundry. Thus the time to make a repair can be shortened. Further, a host computer, which is expensive, is not needed.

EXAMPLE 1

Figure 4:
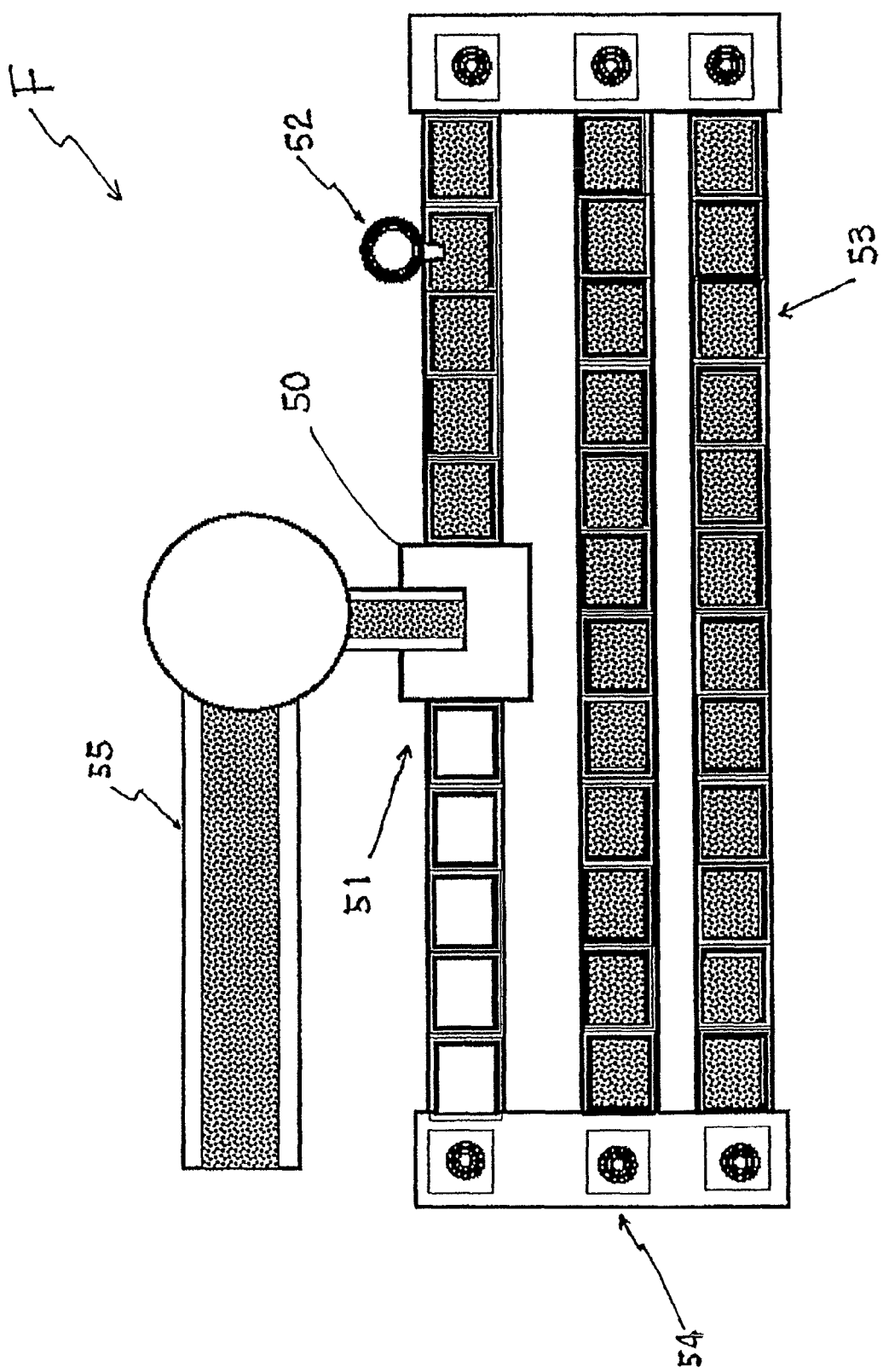
FIG. 4 illustrates an exemplary layout of a foundry to which the system for remote assistance of the present invention is applied.

First, the foundry where the present invention works is described with reference to FIG. 4. In FIG. 4 the foundry F comprises, for example, a molding line 51 for producing casts, a line 52 for pouring molten metal, a line 53 for cooling casts, a line 54 for taking out casts, and a line 55 for treating sand. The molding line 51 includes the molding machine 50.

These lines form a line for manufacturing casts. However, depending on the process used, the line for manufacturing casts may not include a line for treating sand. The lengths of the lines, the position of the actuators, etc., vary on a line.

In foundries, reducing the number of personnel for maintenance is required. Thus effective remote assistance for maintenance is needed.

Figure 2:
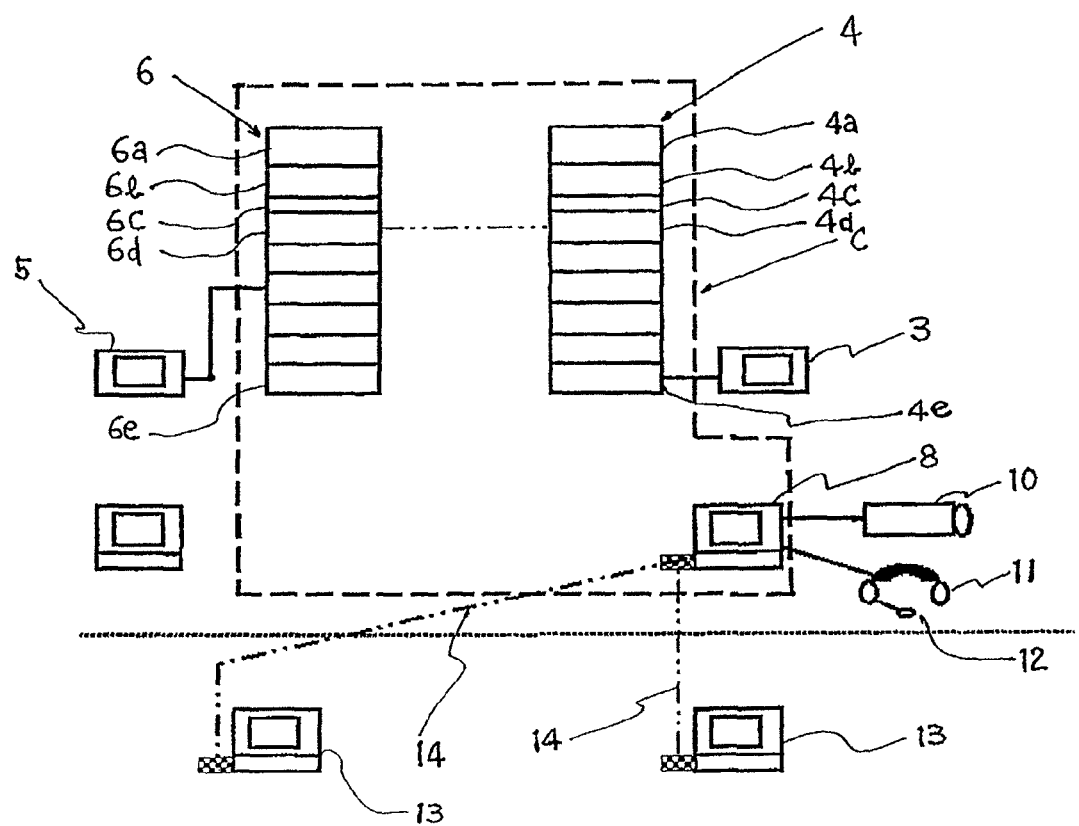
FIG. 2 is a schematic drawing of the system for remote assistance of the present invention.

FIGS. 1 and 2 are schematic drawings of the remote assistant system of the present invention. FIG. 2 is a schematic drawing of the remote assistant system when the system has trouble.

The remote assistant system of the present invention that is used for the foundry F is illustrated in FIG. 4. The system comprises a molding machine 1, a molding line 2, a touchscreen panel 3 for operating the molding line 2, a first sequencer 4 for controlling the molding line 2, a touchscreen panel 5 for operating the molding machine 1, and a second sequencer 6 for controlling the molding machine 1.

The molding machine 1 is positioned at the center of the molding line 2. Foundry sand is supplied from the line 55 for treating sand (see FIG. 4) to the molding machine 1. The molding machine 1 forms a mold by the foundry sand that is supplied. The mold may be either a mold with a flask or a flaskless mold.

The first sequencer 4 and the second sequencer 6 are connected by a sequencer-communicating means 7. In a normal operation, a first mobile computer 8 is connected to the second sequencer 6 through a communicating means 9. However, the first mobile computer 8 may be connected to the first sequencer 4. The communicating means 9 may be wireless or wired.

When the system has trouble, then as shown in FIG. 2, an operator or personnel for maintenance (below, collectively called "operator") carry the mobile computer 8 and a handy camera 10 and the operator wears a headphone set 11. The operator takes, by the handy camera 10, information by video images on the molding machine 1 or the molding line 2 that has trouble. He or she also takes information by voice by a microphone 12. He or she also collects information on a ladder logic program of the first or second sequencer 4, 6 that is installed in the molding machine 1 or the molding line 2 that has trouble. The mobile computer 8, the handy camera 10, the headphone set 11, and the microphone 12, may be integrated. Here the term "mobile computer" includes a device that is specialized for use with the remote assistant system.

The information by video images or by voice or the information on the programs of the first sequencer 4 or the second sequencer 6 is transmitted to a remote location by the mobile computer 8.

In the figure, the area surrounded by dashed lines C denotes a control room. The first sequencer 4 for controlling the molding line 2, the second sequencer 6 for controlling the molding machine 1, and the mobile computer 8 during a normal operation, are placed there.

The first sequencer 4 comprises a power-supply unit 4a, a CPU unit 4b, a communication unit (RS232C) 4c, a wireless communication unit (CC-Link) 4d, and a panel-communication unit 4e.

The second sequencer 6 also comprises a power-supply unit 6a, a CPU unit 6b, a communication unit (RS232C) 6c, a wireless communication unit (CC-Link) 6d, and a panel-communication unit 6e.

The first and second sequencers 4, 6 are connected to the touchscreen panels 3, 5 via the panel-communication units 4e, 6e.

The second mobile computer 13 receives the information by video images and voice and the information on the ladder logic programs of the first and second sequencers 4, 6 from the first mobile computer 8, to display them. The assistant at a remote location looks at that display on the second mobile computer 13, corrects online the ladder logic programs, and transmits instructions to the operator.

The remote assistant system of the present invention comprises a means 14 for providing communication between the first mobile computer 8 and the second mobile computer 13. For the communication, the first mobile computer 8 has software to collect the information by video images and by voice and the information on the ladder logic programs of the sequencers and to correct the ladder logic programs. It also has a program for wireless communication.

The first mobile computer 8 stores, for example, software (GX Developer supplied by Mitsubishi Electric Co., Japan) for programming the ladder logic programs of the sequencers. The software is an integrated programming tool that enhances the efficiency of operations such as designing, debugging, and maintenance. It programs the sequence by a ladder-list-SFC (sequential function charts) and a ST (structured text) language. It has further functions such as setting parameters for a network, monitoring the status of the operation of the network and the sequence program, changing the program and data while executing the program, and switching inputs/outputs on and off.

The first mobile computer 8 also has software for wireless communication. For example, it has the software named "SKYPE" (a registered trademark; supplied by Skype Technologies). By using the software, telephone communications by a computer can be done for free. The computer is connected to the Internet, to use as an Internet telephone. Then telephone communication via a computer that stores SKYPE can be done for free. By using this function, information by voice is effectively used by the assistant.

In addition, the operator and the assistant can talk to each other when both of them use headsets (or use microphones and speakers that are integrated in their computers). The first mobile computer has, for example, the software named "EMOBILE" (supplied by EMOBILE Ltd., Japan) as software for communication. The "EM Mobile Broadband" supplied by EMOBILE Ltd. employs communication technologies, such as HSDPA and HSUPA, to achieve, for example, 7.2 Mbps for downstream and 1.4 Mbps for upstream, at a maximum.

With the configuration as mentioned above, the remote assistance system of the present invention can repair a machine that has troubles.

Figure 3:
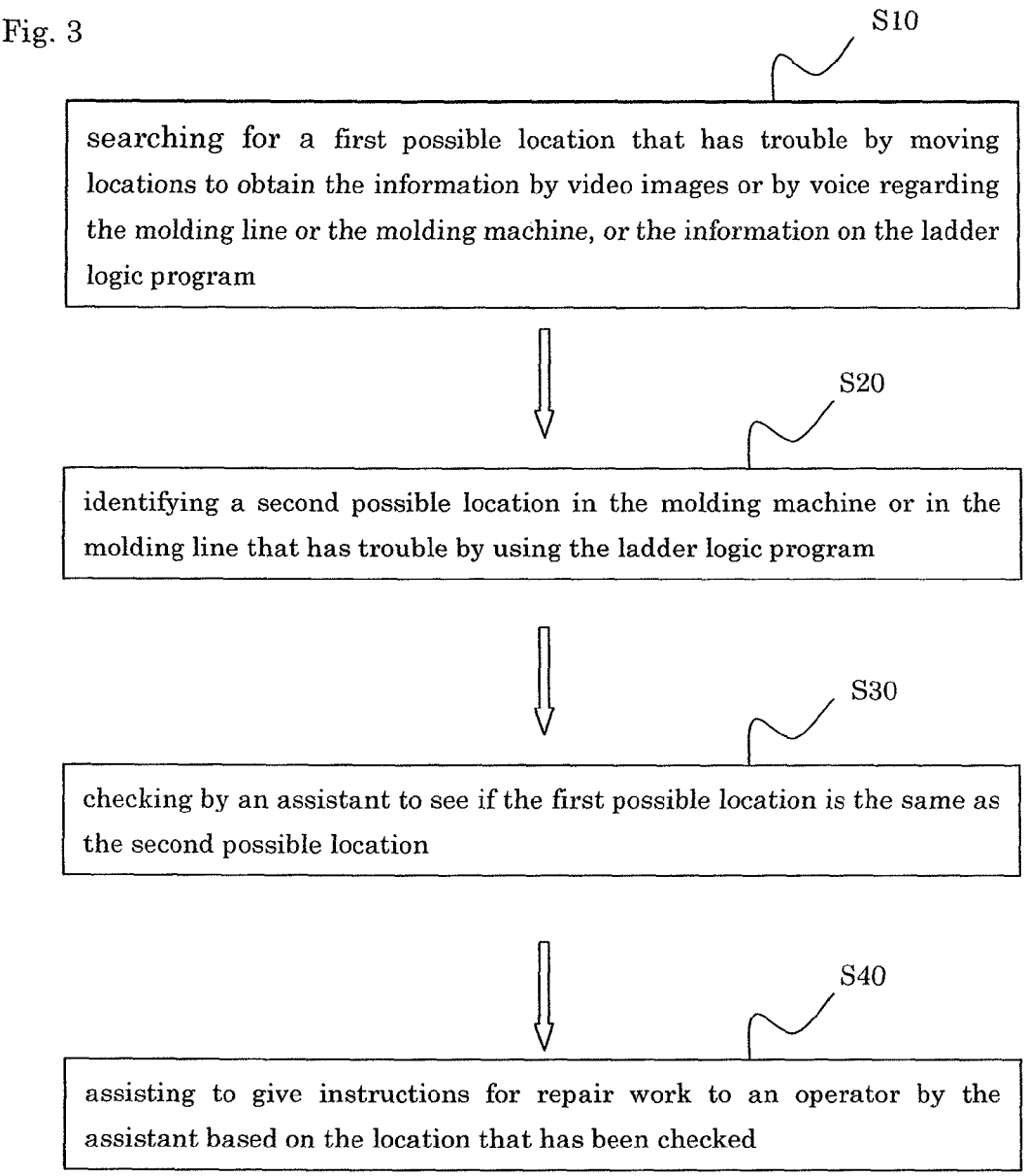
FIG. 3 is a flowchart for showing the method for remote assistance.

Below the functions of the system with the configuration are described with reference to FIG. 3. The case in which the molding machine has trouble is described. If the molding machine 1 has trouble, the operator starts up a remote-assistant function of the first mobile computer 8. Simultaneously, the operator rushes to the site. But at this time the location of the trouble is unknown. Since the remote-assistant function is started up, the starting signal is transmitted to the second mobile computer 13, which is at a remote location, through the means for providing wireless communication between the first mobile computer and the second mobile computer.

The second mobile computer 13 transmits a signal for authorization via the means for providing wireless communication to open the communication line between the first mobile computer 8 and the second mobile computer 13.

The information by video images and by voice and the information on the ladder logic programs about the molding line or the molding line that has trouble are displayed on the second mobile computer 13 through the means for providing wireless communication. If the operator moves, the handy camera 10 and the microphone 12 also move. Thus, the handy camera 10 can take a picture of any location. The location of the information by video images and by voice changes with the movement of the operator (S10). So, the assistant at a remote location receives the message from the operator regarding the location of the trouble that is derived from the appearance.

The assistant receives the information by video images and by voice that are displayed on the second mobile computer 13. He or she obtains the information on the ladder logic program of the second sequencer 6, which controls a plurality of machines that are placed in various locations in the foundry F. Then he or she can estimate the location that has trouble. In this way a possible location that has trouble is searched for (S20).

Then the assistant checks to see if the location of the trouble that is searched for by the movement of the operator (S10) is the same as the location that is searched for through the information on the ladder logic program (S20). By confirming that the location (S10) is the same as that location (S20), the location of the molding machine 1 that has trouble is determined (S30). Then, if necessary, the assistant transmits data from the second mobile computer 13 via the first mobile computer 8 to correct online the ladder logic program. Alternatively, he or she gives instructions for repair to the operator (S40). The assistant arranges parts at once if the parts need to be replaced.

The second sequencer for controlling the molding machine 1 comprises, for each expendable part of the molding machine 1, a means for memorizing a criterion for how many times the part can be used, a means for counting the number of times the part is actually used, and a means for comparing the number counted with the number used as a criterion. Thus, since it is recognized that the lifetime of the expendable part is approaching, ordering a new part to replace the expendable part becomes easier.

The remote assistant system of the present invention can have its safety enhanced for repair work by using an additional motion sensor. Such a motion sensor uses infrared rays, ultrasonic waves, visible light, etc. It is located at the entrance to the plant. The data detected by the sensor is added to the information by video images and by voice on the second mobile computer to better recognize if personnel are in the plant.

If a mechanical part of the molding machine 1 has trouble, the assistant gives instructions for repair to the operator, since the assistant cannot access the machine.

In this way repair work for the molding machine is quickly done. The touchscreen panel can also be used to start the molding machine.

A computer for analyzing a waveform may be connected to the molding machine. It analyzes the waveform that is generated in the molding machine to estimate the location that has trouble. By analyzing and storing data on the waveform, the location and status of the trouble is quickly recognized. The waveform may be, for example, the waveform showing the air pressure in a storage tank for sand. That waveform is one of the most important waveforms to judge if the molding process works well. If the waveform showing the air pressure in a storage tank for sand is used, the waveform that is actually measured during the operation of the molding machine is compared with the standard waveform that is selected depending on the mold to be formed by the molding machine. Thus a judgment is made if the actual waveform remains within the predetermined allowance. A pressure gauge is used to measure the waveform showing the air pressure in the storage tank for sand. The waveform to be analyzed can be one of the other waveforms that are generated during the molding process.

In the embodiment discussed above, the first mobile computer is located in the control room or the foundry during the normal operation. However, since it has software for wireless communication that can be executed while it moves, an urgent support for trouble in the molding machine or the molding line can be carried out.

If the operator needs supporting staff in addition to the remote assistance, directions such as those for ordering a part of the molding machine can be given by using the second mobile computer while the supporting staff moves to the site.

As can be seen from the above discussion, the present invention allows urgent and safe repair work for a foundry that comprises a plurality of machines by combining the information by video images, the information by voice, and the information on the ladder logic programs. Further, even if maintenance personnel are not at the site, the operator can receives instructions for repair work.

INDUSTRIAL APPLICABILITY

The remote assistant system in the foundry of the present invention can be utilized for remote assistance in various plants that comprise a plurality of machines that are controlled by respective PLCs.

The invention claimed is:

1. A remote assistant system in a foundry comprising at least a touchscreen panel for operating a molding line having a molding machine, a first sequencer for controlling the molding line, a touchscreen panel for operating the molding machine, and a second sequencer for controlling the molding machine, the system further comprising:
   a sequencer-communicating means for connecting the first sequencer to the second sequencer:
   a first mobile computer connected to a means for providing communication between mobile computers, the first mobile computer taking information by video images and information by voice on an appearance of the molding machine or the molding line that has trouble and the information on a ladder program of the first sequencer or the second sequencer of the molding line or the molding machine that has trouble, and transmitting the information by video images, the information by voice, or the information on the ladder logic program of the first or second sequencer;
   a means for providing wireless communication between mobile computers, the means selectively connecting one of the sequencers to the first mobile computer;

a second mobile computer receiving the information by video images, the information by voice, or the information on the ladder logic program of the first or second sequencer, and displaying the information, the second mobile computer transmitting online data for correcting the ladder logic program and instructions for repairing the molding machine or the molding line; and a means for providing communication between the first mobile computer and the second mobile computer.

2. The remote assistant system in the foundry of claim 1, wherein the second sequencer comprises, for each expendable part of the molding machine, a means for memorizing a criterion on how many times the part can be used, a means for counting a number of times the part is actually used, and a means for comparing the number that is counted with a number used as a criterion.

3. The remote assistant system in the foundry of claim 1 or 2, further comprising:

a personal computer for analyzing waveforms generated by the molding machine to recognize a location of the trouble in the molding machine.

4. The remote assistant system in the foundry of claim 1, wherein the first mobile computer is located in a control room of the foundry or in the foundry during a normal operation, and the first mobile computer has software for communicating while it moves when the molding machine or the molding line has trouble.

5. A method for remote assistance using the remote assistant system in the foundry of claim 1 comprising the steps of:

searching for a first possible location that has trouble by moving locations to obtain the information by video images or by voice regarding the molding line or the molding machine, or the information on the ladder logic program;

identifying a second possible location in the molding machine or the molding line that has trouble by using the ladder logic program;

checking to see if the first possible location is the same as the second possible location; and assisting to give instructions for repair work on the molding machine or the molding line based on a location that has been checked.

* * * * *